United States Patent
Takahashi (10) Patent No.: US 10,136,022 B2
(45) Date of Patent: Nov. 20, 2018

(54) IMAGE FORMING SYSTEM AND IMAGE FORMING SYSTEM CONTROL METHOD FOR OUTPUTTING HISTORY INFORMATION OF EXECUTED JOBS INCLUDING INFORMATION INDICATING PRINT SPEEDS

(71) Applicant: CANON KABUSHIKI KAISHA, Tokyo (JP)

(72) Inventor: Toru Takahashi, Matsudo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/789,866

(22) Filed: Oct. 20, 2017

(65) Prior Publication Data
US 2018/0115678 A1    Apr. 26, 2018

(30) Foreign Application Priority Data
Oct. 26, 2016    (JP) ................. 2016-209491

(51) Int. Cl.
*H04N 1/32*    (2006.01)
*H04N 1/047*    (2006.01)
*H04N 1/00*    (2006.01)

(52) U.S. Cl.
CPC ..... *H04N 1/32112* (2013.01); *H04N 1/00652* (2013.01); *H04N 1/047* (2013.01)

(58) Field of Classification Search
None
See application file for complete search history.

(56) References Cited

U.S. PATENT DOCUMENTS

2005/0111866 A1*  5/2005  Sato ............... G03G 15/5016
                                                        399/79
2014/0320902 A1* 10/2014  Nakatani ......... G03G 15/502
                                                        358/1.15

FOREIGN PATENT DOCUMENTS

JP        20160022599 A    2/2016

* cited by examiner

*Primary Examiner* — Andrew H Lam
(74) *Attorney, Agent, or Firm* — Canon U.S.A., Inc. IP Division (57) ABSTRACT

An image forming system capable of changing a print speed includes an execution unit that executes a print job in accordance with a set print speed, and an output unit that displays or prints history information of the print job including information representing the print speed set when the print job was executed.

14 Claims, 7 Drawing Sheets

| | | |
|---|---|---|
| 401 | Record No. | 00123 |
| 402 | Job ID | P00123 |
| 403 | Job type | Print |
| 404 | Document name | Bill XXX |
| 405 | User name | guest |
| 406 | Execution result | OK |
| 407 | Reception time | 2016/07/01 12:35 |
| 408 | Execution time | 190 seconds |
| 409 | Print speed model | 50 PPM model |
| 410 | Average print speed | 48 PPM |
| 411 | Number of document pages | 16 pages |
| 412 | Number of output copies | 19 copies |
| 413 | Number of all output pages | 152 pages |
| 414 | Print settings | |
| 415 | Paper size | A4 |
| 416 | Paper type | Normal paper |
| 417 | Single sided/double sided | Single-sided printing |
| 418 | Finish | Staple |

| | | |
|---|---|---|
| 401 | Record No. | 00123 |
| 402 | Job ID | P00123 |
| 403 | Job type | Print |
| 404 | Document name | Bill XXX |
| 405 | User name | guest |
| 406 | Execution result | OK |
| 407 | Reception time | 2016/07/01 12:35 |
| 408 | Execution time | 190 seconds |
| 409 | Print speed model | 50 PPM model |
| 410 | Average print speed | 48 PPM |
| 411 | Number of document pages | 16 pages |
| 412 | Number of output copies | 19 copies |
| 413 | Number of all output pages | 152 pages |
| 414 | Print settings | |
| 415 | Paper size | A4 |
| 416 | Paper type | Normal paper |
| 417 | Single sided/double sided | Single-sided printing |
| 418 | Finish | Staple |

Job history — 600

| Reception time | Document name | User name ▽ | Result | Comparison of execution times by print speed models | | |
|---|---|---|---|---|---|---|
| | | | | 80 PPM | 65 PPM | 50 PPM |
| 2016/07/01 12:35 | Bill XXX | guest | OK | 123 seconds (+60%) | 149 seconds (+30%) | 190 seconds (----) |
| 2016/07/01 12:40 | Bill YYY | guest | OK | 38 seconds (+60%) | 46 seconds (+30%) | 60 seconds (----) |
| 2016/07/02 09:32 | Written approval KKK | user A | OK | 30 seconds (-4%) | 31 seconds (-4%) | 32 seconds (-7%) |
| ... | ... | ... | ... | ... | ... | ... |
| 2016/07/05 09:32 | Report AAA | guest | OK | 16 seconds (+30%) | 18 seconds (+30%) | 20 seconds (----) |

611 — Reception time
612 — Document name
613 — User name
614 — Result
615 — Comparison of execution times by print speed models
610

620 — Detailed information button
630 — List print button
640 — OK button

IMAGE FORMING SYSTEM AND IMAGE FORMING SYSTEM CONTROL METHOD FOR OUTPUTTING HISTORY INFORMATION OF EXECUTED JOBS INCLUDING INFORMATION INDICATING PRINT SPEEDS

BACKGROUND

Field of the Disclosure

The present disclosure relates to an image forming system and an image forming system control method.

Description of the Related Art

Output of a report relating to a print job history from a conventional print apparatus has allowed an administrator to know a use state such as a number of print sheets in the print apparatus. This print job history has been based on the presumption that a maximum value of a print speed of the print apparatus (pages per minute (PPM)) is fixed in the print apparatus. However, in recent years, the PPM has come to be changeable in accordance with users' needs. Japanese Patent Application Laid-Open No. 2016-022599 discloses a print apparatus that can increase the PPM to execute a print job when a license is valid.

Conventionally, when a print job history is displayed, the change in the PPM is not taken into account. Thus, the administrator cannot easily know a relationship between the PPM and a use state such as a relationship between the PPM and a number of printed sheets when the print job is executed. For this reason, for example, a user cannot know later the PPM that has been set when each job has been executed. Thus, the user cannot check an effect of the change in the PPM later.

SUMMARY

The present disclosure is directed to a method for enabling a user to easily recognize a relationship between a print speed setting and a use state such as a relationship between the print speed setting and a number of printed sheets when a print job is executed.

According to an aspect of the present disclosure, an image forming system capable of changing a print speed includes an execution unit that executes a print job in accordance with a set print speed, and an output unit that displays or prints history information of the print job including information representing the print speed set when the print job was executed.

Further features of the present disclosure will become apparent from the following description of exemplary embodiments with reference to the attached drawings.

DESCRIPTION OF THE EMBODIMENTS

An exemplary embodiment of the present disclosure will be described below with reference to the drawings.

Figure 1:
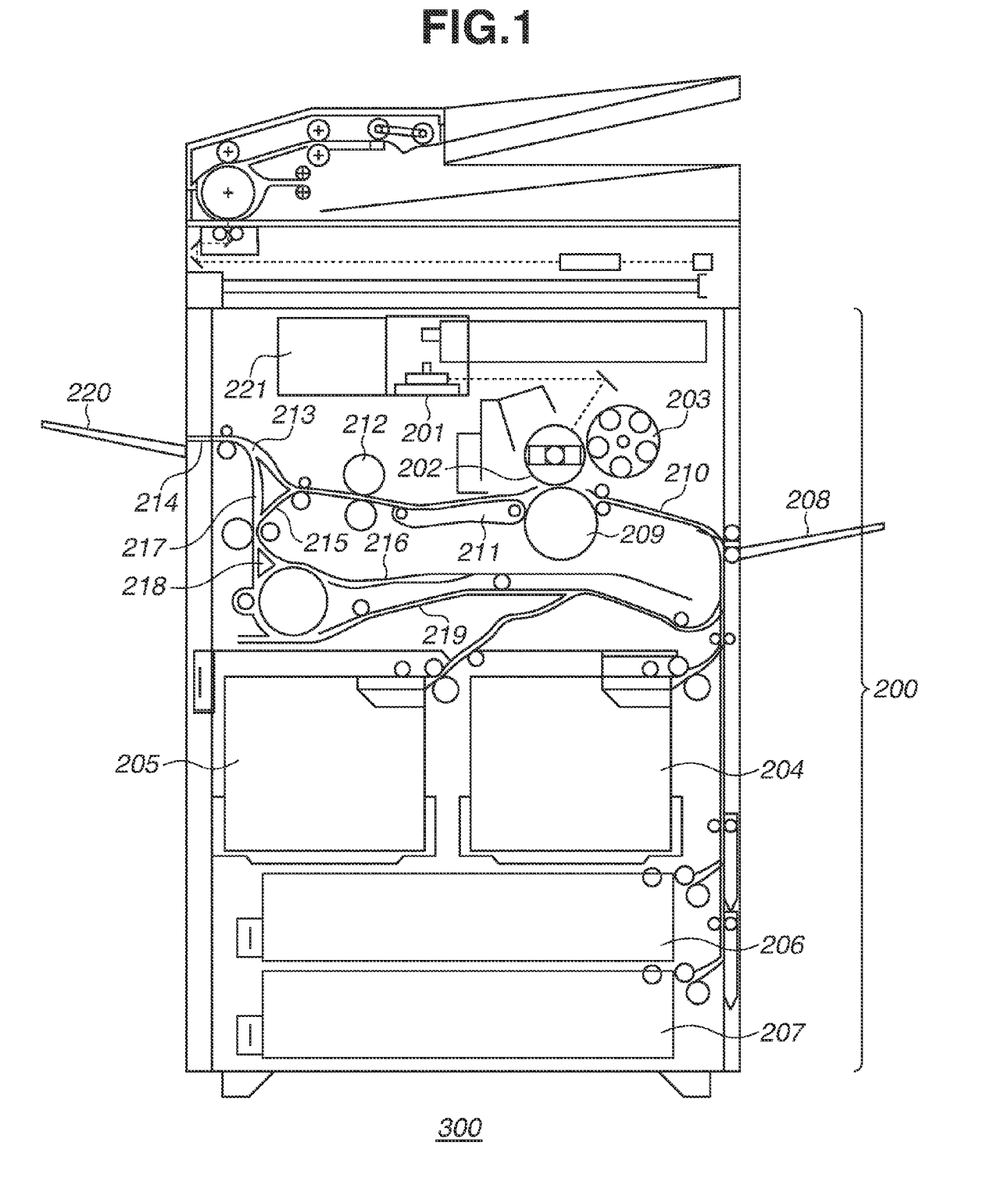
FIG. 1 is a cross-sectional view illustrating a configuration of a printer unit of a print apparatus according to one or more aspects of the present disclosure.

FIG. 1 is a cross-sectional view illustrating a configuration of a printer unit of a print apparatus to which an image forming apparatus according to one present exemplary embodiment of the present disclosure is applicable. A print apparatus 300 in FIG. 1 is one example of an image forming apparatus of the present disclosure, which has a printer unit 200. Configurations and operations of respective units of the printer unit 200 will be described below.

A laser driver 221 of the printer unit 200 is used to drive a laser emission unit 201. The laser driver 221 causes laser emission unit 201 to emit a laser beam in accordance with image data output from a controller unit 310 illustrated in FIG. 2, described later. The laser beam is emitted to a photoconductive drum 202, and a latent image in accordance with the laser beam is formed on the photoconductive drum 202. In the printer unit 200, a developing device 203 causes a developing agent to adhere to a portion of the photoconductive drum 202 where the latent image is formed.

The printer unit 200 includes, as a print paper storage part, cassettes 204, 205, 206, and 207 each having a drawer shape, and manual sheet feed stage 208 of a tray shape exposed to the outside of the apparatus. Print paper can be supplied to the cassettes 204 to 207 when they are pulled out, replenished with print paper, and are closed, aside from the manual sheet feed stage 208.

The printer unit 200 feeds print paper from any one of the cassettes 204, 205, 206, and 207, and the manual sheet feed stage 208 in synchronization with start of laser beam emission, and convey the print paper through a conveyance path 210 to a transfer unit 209. The transfer unit 209 transfers the developing agent attached to the photoconductive drum 202 to the print paper. A conveyance belt 211 conveys the print paper to which the developing agent adheres, to a fixing unit 212. The fixing unit 212 fixes the developing agent to the print paper by applying a heat and a pressure. The print paper which has passed through the fixing unit 212 passes through conveyance paths 213 and 214 to be discharged. Alternatively, in a case where the print paper is output with a printed surfaces of the print paper inverted, the print paper is led to a conveyance path 215, and is conveyed in an opposite direction. The print paper then passes through a conveyance path 217 and the conveyance path 214 to be discharged. The discharged print paper is conveyed to and stacked on a discharge bin 220.

In a case where double-sided printing is performed, the print paper passes through the fixing unit 212, and is led from the conveyance path 215 to a conveyance path 216 by a flapper 218. Then, the print paper is conveyed in the reverse direction, and is led to a sheet re-feeding conveyance path 219 by the flapper 218. The print paper led to the sheet re-feeding conveyance path 219 passes through the conveyance path 210 in synchronization with the start of the emission of a laser beam and is fed to the transfer unit 209. The print paper is then discharged from the conveyance path 214.

A sensor that detects conveyance of print paper is provided in each of the conveyance path 214 and the sheet re-feeding conveyance path 219. Each sensor can measure a number of print sheets conveyed per minute during a printing operation to obtain maximum pages per minute (PPM) of the print apparatus 300.

The print apparatus 300 can change over a print speed. The print apparatus 300 controls a conveyance speed or a conveyance interval of print paper conveyed from a sheet feeding unit through the respective conveyance paths to change the PPM (i.e. print speed).

Figure 2:
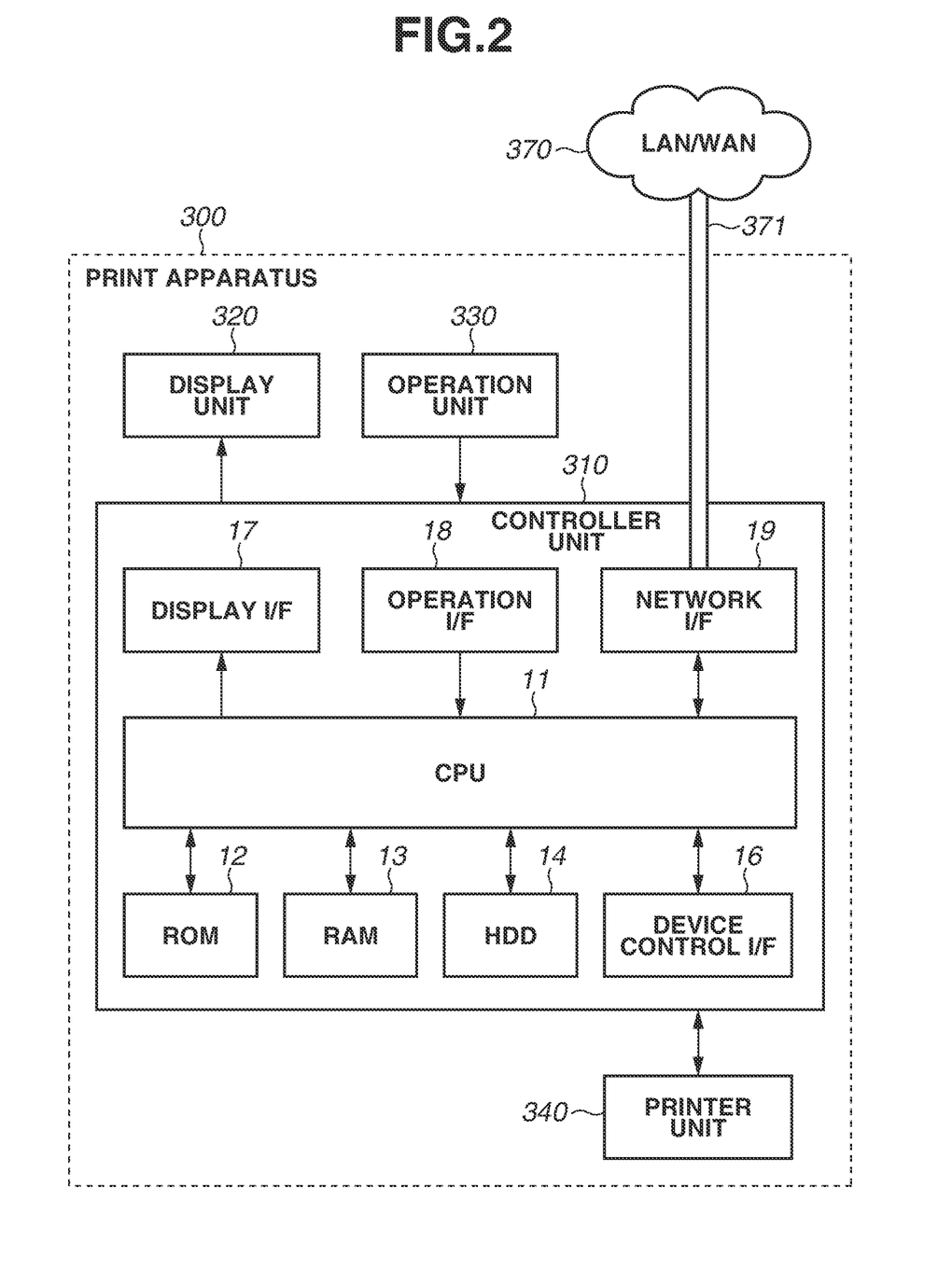
FIG. 2 is a schematic diagram of a hardware system configuration of the print apparatus according to one or more aspects of the present disclosure.

FIG. 2 is a diagram illustrating an outline of a hardware system configuration of the print apparatus 300. The print apparatus 300 includes a controller unit 310, a display unit 320, an operation unit 330, and a printer unit 340.

The display unit 320 includes a light emitting diode (LED) and a liquid crystal display, and displays an operation of an operator and an internal state of the apparatus. The operation unit 330 receives the operation from the operator. The operation unit 330 includes not only a plurality of operation buttons, but can be realized as a touch display in combination with the display unit 320. The printer unit 340 corresponds to the printer unit 200 in FIG. 1, and prints image data on paper media.

The controller unit 310 includes a central processing unit (CPU) 11, a read only memory (ROM) 12, a random access memory (RAM) 13, a hard disk drive (HDD) 14, a device control interface (I/F) 16, a display I/F 17, an operation I/F 18, and a network I/F 19. The controller unit 310 may include an application specific integrated circuit (ASIC) (not illustrated). The ASIC may partially assume processing to be executed in the CPU 11.

The CPU 11 is a medium that executes a control program installed in the print apparatus 300, and controls operations of devices connected to the controller unit 310 via the respective I/Fs, a memory of a storage medium, and a dedicated chip. The ROM 12 is a nonvolatile memory, the RAM 13 is a volatile memory, and the HDD 14 is a storage medium such as a magnetic disk. A control program for executing a flowchart, described below, is stored in the ROM 12 or the HDD 14. The control program is developed in the RAM 13 as necessary at a time of execution, and is executed by the CPU 11.

Further, the RAM 13 operates as a work memory when the control program is executed in CPU 11, and stores a print job and image data to be printed. The HDD 14 also stores a print job and image data to be printed. FIG. 2 illustrates only the one CPU 11, ROM 12, RAM 13, and HDD 14, but a plurality of them may be provided in the apparatus as another exemplary embodiment. In this case, a configuration and a connecting form are not limited to the present exemplary embodiment. Further, instead of or in combination of the HDD, another storage device such as a solid state drive (SSD) may be provided.

The device control I/F 16 controls input/output of information to and from a device connected to the controller unit 310 (in this exemplary embodiment, the printer unit 340), and conducts communication such as giving a device control instruction and a device state notification. A scanner unit is connected to the controller unit 310 of the print apparatus 300 (not illustrated in FIG. 2), and the scanner unit may be controlled via the device control I/F 16. That is, the print apparatus 300 may be a multifunction device.

The display I/F 17 assumes output processing to the display unit 320. The operation I/F 18 assumes input processing from the operation unit 330.

The print apparatus 300 has the network I/F 19 as an external I/F. The network I/F 19 assumes data input/output processing with respect to the network. The print apparatus 300 can be connected to a local area network/wide area network (LAN/WAN) 370 as an internet or an intranet by a network cable 371 via the network I/F 19. The LAN/WAN 370 may be wirelessly connected without using the network cable 371. Further, the print apparatus 300 may be connected to an external device such as a personal computer (PC) via another external I/F.

Figure 3:
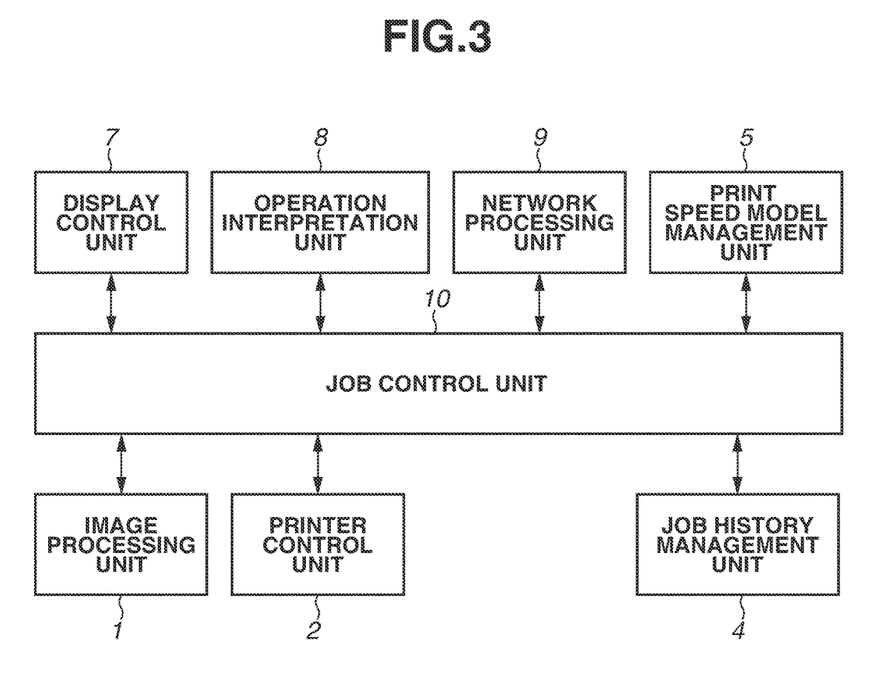
FIG. 3 is a software configuration diagram of a control program installed in the print apparatus according to one or more aspects of the present disclosure.

FIG. 3 is a block diagram illustrating a software configuration of the control program contained in the print apparatus 300.

The control program to be installed in the print apparatus 300 according to the present exemplary embodiment is stored in, for example, the ROM 12. In the print apparatus 300, CPU 11 reads out and executes the control program recorded in the ROM 12 to realize functions of a job control unit 10, an image processing unit 1, a printer control unit 2, a job history management unit 4, a print speed model management unit 5, a display control unit 7, an operation interpretation unit 8, and a network processing unit 9.

The display control unit 7 receives information such as a job and a state of the apparatus from the job control unit 10, and transmits a command to reflect the information in the display screen, to the display I/F 17.

The operation interpretation unit 8 receives an operation command from the operation I/F 18, and instructs the job control unit 10 to start, interrupt, restart, and end a job.

The network processing unit 9 realizes data transmission/reception via the network I/F 19. The image processing unit 1 receives document image data read by the scanner unit (not illustrated in FIG. 2), or develops the received image data when the image data is a page description language (PDL) data. The image processing unit 1 then executes various image processing to create image data.

The printer control unit 2 communicates a print control command such as a feed instruction command via the device control I/F 16 to control the printer unit 340, and prints the image data on paper media (sheets).

The print speed model management unit 5 manages a plurality of print speed models (e.g. 50 PPM, 65 PPM and 80 PPM) corresponding to each unit of a changed maximum PPM in the print apparatus 30. A license server (not illustrated) connected via the network I/F 19 may manage licenses corresponding to the print speed models of the print apparatus 300. At this time, the print speed model management unit 5 inquires of the license server as to whether a license of a set print speed model is valid, and stores a result in the RAM 13 or the HDD 14. In such a manner, the print speed model management unit 5 manages the print speed models. In this case, the print speed models are managed corresponding to job attributes (a document name, a user name, etc.) or terms of license validity. Thus, the print speed model management unit 5 manages the print speed setting. Here, the print speed model management unit 5 serves as a set unit that sets, for a job to be executed, one of a plurality of print speeds models.

The job control unit 10 receives data sent from the operation I/F 18 and the network I/F 19 as jobs, and executes the jobs while controlling the operations of the devices in accordance with contents of the jobs. At this time, by executing a printing job via the printer control unit 2, the job control unit 10 acquires a print speed model from the print speed model management unit 5 while the job is executed. Then, the job control unit 10 transmits a command to print in the acquired print speed model, to the printer control unit 2. The job control unit 10 acquires a result of conveyance of print paper from the printer control unit 2, and measures a number of print sheets conveyed per minute during the printing operation (PPM) for each job. The above "during the printing operation" refers to a state where the printing is normally performed, and thus does not include error interruption and adjustment time such as calibration. When the print job to be measured is performed after a preceding print job, the measurement starts after print paper of a final page in the preceding job has been conveyed. Thus, when executing the print job, the job control unit 10 can measure an actual execution speed of the print job.

The job history management unit 4 manages an attribute of a job to be executed by the job control unit 10, the print speed model acquired from the print speed model management unit 5, and a job execution result including the obtained PPM as a job history. When a job history display request command is received from the operation I/F 18, the job control unit 10 performs control to display the job history managed by the job history management unit 4 in a predetermined format on the display unit 320. Alternatively, when a command requesting the job history print is received from the operation I/F 18, the job control unit 10 performs control to print the job history managed by the job history management unit 4 in a predetermined format. In addition, when a command requesting job history acquisition is received from the network I/F 19, the job control unit 10 may transmit the job history managed by the job history management unit 4 to the request source.

The job, which is executed by the job control unit and of which history is managed by the job history management unit 4, includes not only the print job for printing received print data through the printer unit 340, but also a copy job. In the copy job, document image data, which is read by the scanner unit (not illustrated in FIG. 2), is printed by the printer unit 340.

Figure 4:
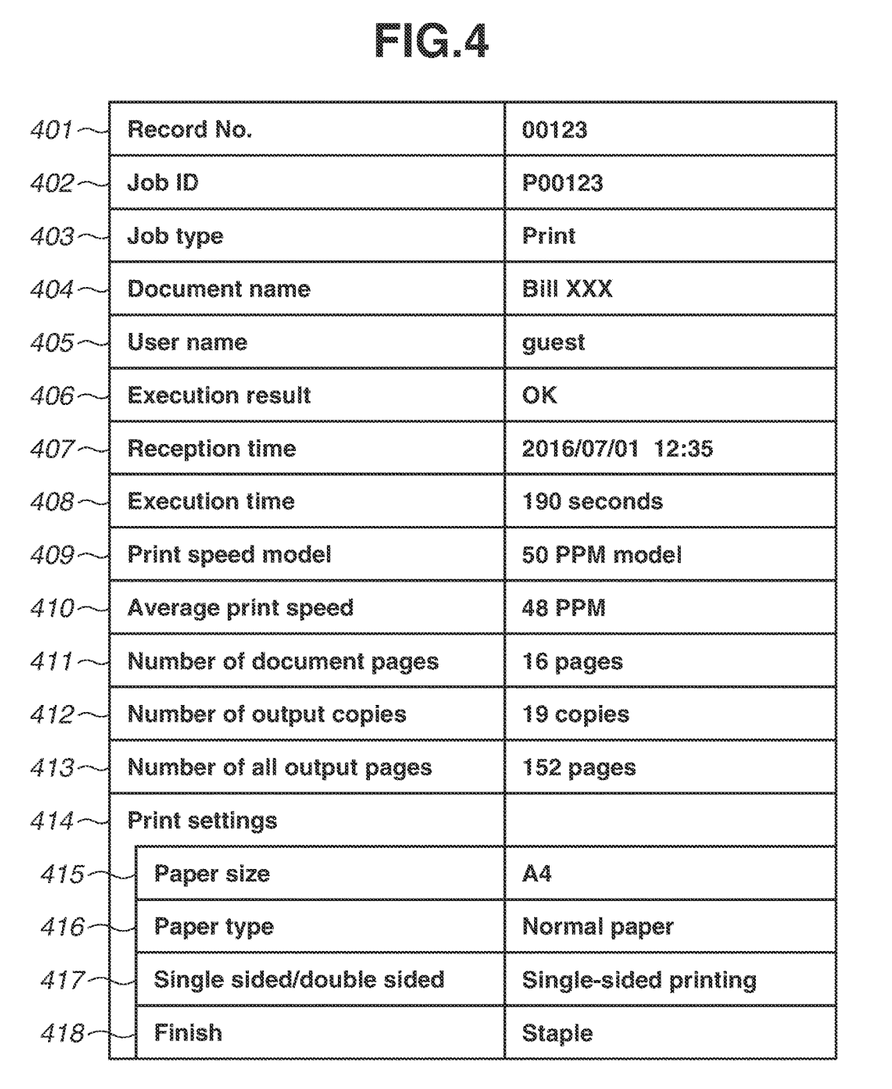
FIG. 4 is a diagram illustrating one record of job histories managed by a job history management unit according to one or more aspects of the present disclosure.

FIG. 4 is a diagram illustrating one record of job histories managed by the job history management unit 4. A record No. 401 is a number for uniquely identifying a record of a job history.

A job ID 402 is an identifier of the job. A job type 403 is information representing a job type which includes "copy", "print", etc.

A document name 404 is a name of a document which has been subject to the job. A user name 405 is a name of a user who has instructed execution of the job. An execution result 406 represents the execution result of the job. A reception time 407 is a time when the job control unit 10 receives the job. An execution time 408 is a time required for executing the job.

A print speed model 409 is a print speed model that has been acquired from the print speed model management unit 5 and executed by the job control unit 10.

An average print speed 410 is the PPM that has been measured and acquired while the job control unit 10 is executing the print operation in the job.

A number of document pages 411 represents a number of document pages of the job. A number of output copies 412 represents a number of copies of a print result of the job. A number of all output pages 413 represents a number of printed pages in the print result of the job.

Print settings 414 are settings of the job which include information such as paper size 415, paper type 416, single side/double side 417, and finish 418.

Thus, the job history management unit 4 manages the history information of the print job including information about the print speed setting at a time of executing the print job, and information about an actual execution speed of the print job measured in the above-mentioned method.

Items constituting one record of job histories illustrated in FIG. 4 are examples and are not limited to the examples. The items constituting one record of job histories may be any information as long as the information is related to the executed job.

Figure 5:
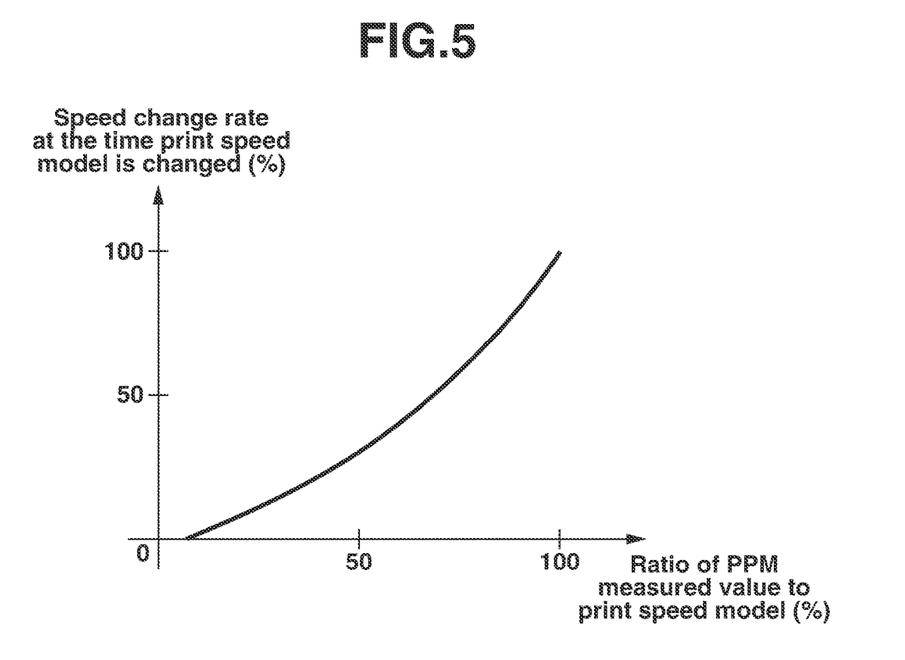
FIG. 5 is a graph illustrating a tendency of each print speed model and a PPM measured value according to one or more aspects of the present disclosure.

FIG. 5 is a graph illustrating a tendency of each print speed model of the print apparatus 300 and the PPM value measured by the job control unit 10.

FIG. 5 illustrates that there is a correlation between a ratio of the PPM measured value via-a-vis the PPM of the print speed model (a ratio of the PPM measured value to the print speed model), and a speed change rate at a time the print speed model is changed (an effect at the time the print speed model is changed).

That is, FIG. 5 illustrates that in a job in which a difference between the PPM measured value and the PPM of the print speed model is great, productivity (PPM measured value) has a tendency to be comparable with each other even between different print speed models. On the contrary, in a job in which a difference between the PPM measured value and the PPM of the print speed model is small, a tendency can be found that productivity of each print speed model can be exploited (namely, the productivity (PPM measured value) according to each print speed model can be realized).

The above tendency will be described below by showing two types of jobs for two different types of print paper. In a job using thick paper with large grammage (a weight per predetermined dimension), the productivity does not differ in any print speed model. On the other hand, in a job using normal paper with small grammage, in the higher print speed model printing is performed, the larger the productivity gain. The correlation illustrated in FIG. 5 can be expressed by a following expression.

$$\text{Speed change rate } rcs = f\left(\frac{PPM \text{ measured value}}{\text{Maximum } PPM \text{ of print speed model}}\right) \quad \text{[Expression 1]}$$

A correlation function f in the expression 1 can be obtained in advance based on characteristics and a measurement result in the print apparatus. FIG. 5 illustrates one example of the correlation.

In the present exemplary embodiment, the correlation is used to estimate a print time when the printing is performed in another print speed model, based on a PPM measured value (an average print speed 410 in FIG. 4) in a print speed model at the time of executing a job (409 in FIG. 4).

Next, a method for estimating the print time and the entire execution time of the job, and an effect produced by changing the print speed model will be described, in a case where a print job represented by one record of the job histories managed by the job history management unit 4 is performed in another print speed mode.

The print time indicates only a time when the printing is normally performed, and does not include an error interruption time and an adjustment time. Further, the execution time of the entire job indicates a whole time from reception to end of the job performed by the job control unit 10.

When the job indicated by one record of the job histories managed by the job history management unit 4 is changed to a print speed model to be estimated, a value of PPM at the estimated print speed is obtained by the following expression 2, where "print speed model" in the expression 2 represents a PPM value of the print speed model (409 in FIG. 4), and "print speed model to be estimated" represents a PPM value of a print speed model to be estimated.

$$\text{Estimated print speed p\_ppm} = \text{print speed model} + (\text{print speed model to be estimated} - \text{print speed model}) \times \text{speed change rate rcs} \qquad \text{[Expression 2]}$$

Further, the print time of the job representing one record of the job histories managed by the job history management unit 4 and a time (non-print time) other than the print time are obtained by the following expressions 3 and 4. "Number of all output pages" and "PPM measured value" in the expression 3 correspond to the number of all output pages 413 and the average print speed 410 in FIG. 4, respectively. Further, "execution time" in the expression 4 corresponds to the execution time 408 in FIG. 4.

$$\text{Print time of Hitory Job } pt(\text{sec}) = \frac{\text{number of all output pages}}{\text{PPM measured value}} \times 60 \qquad \text{[Expression 3]}$$

$$\text{Non-print time of history job } et(\text{sec}) = \text{execution time} - \text{print time } pt \qquad \text{[Expression 4]}$$

From these results, an estimated print time p_pt at the time of printing in the print speed model to be estimated is obtained by the following expression 5.

$$\text{Estimated print time p\_pt(sec)} = \frac{\text{print speed model}}{\text{estimated print speed p\_ppm}} \times \text{actual print time } pt \qquad \text{[Expression 5]}$$

Further, an improvement ratio representing an effect produced by the change to the print speed model to be estimated is obtained by the following expression.

$$\text{Improvement ratio (\%)} = \frac{\text{estimated print speed p\_ppm} - \text{PPM measured value}}{\text{PPM measured value}} \times 100 \qquad \text{[Expression 6]}$$

Further, an estimation time p_rt that is the execution time of the entire job at the time of executing the job in print speed model to be estimated is obtained by the following expression 7.

$$\text{Estimated execution time p\_rt(sec)} = \text{estimated print time p\_pt} + \text{non-print time } et \qquad \text{[Expression 7]}$$

The print apparatus 300 estimates an actual speed assuming the print job is executed at another set print speed. In this estimation, information about print speed setting included in the history information of the print job and information about the actual execution speed are used.

Figure 6:
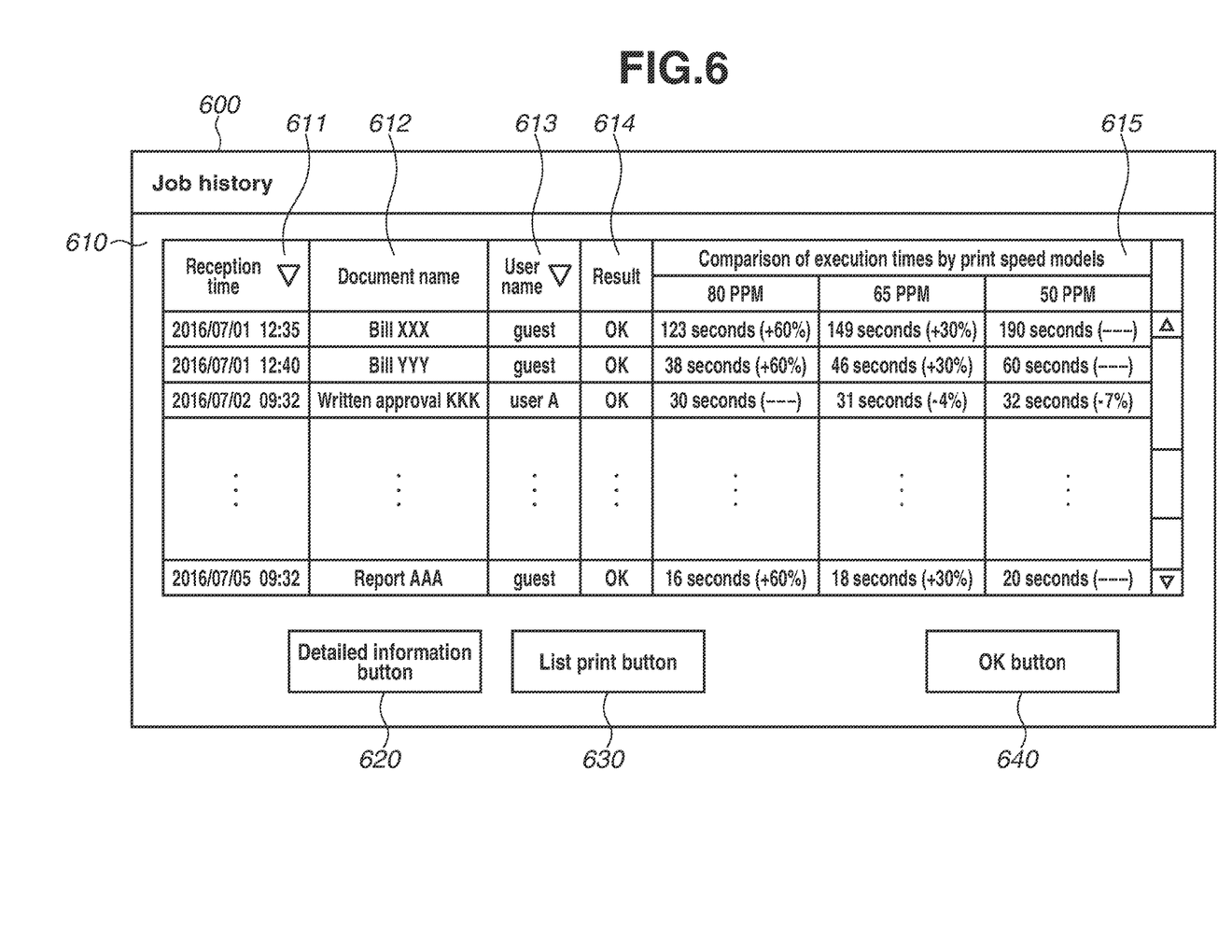
FIG. 6 is a diagram illustrating a job history display screen according to one or more aspects of the present disclosure.

FIG. 6 is a diagram illustrating a screen showing a history of the job executed by the print apparatus 300. FIG. 6 illustrates one example of a screen shown on a touch display by the CPU 11. The touch display is realized by the display unit 320 and the operation unit 330.

A job history screen 600 includes a job history list 610, a detailed information button 620, a list print button 630, and an OK button 640.

The job history list 610 includes a reception time display field 611, a document name display field 612, a user name display field 613, a result display field 614, and a display field 615 for comparing execution times for each print speed model. These fields 611 to 614 are used to display record contents of the job history acquired from the job history management unit 4 by the job control unit 10.

In the reception time display field 611, information corresponding to the reception time 407 of FIG. 4 is displayed. In the document name display field 612, information corresponding to the document name 404 of FIG. 4 is displayed. In the user name display field 613, information corresponding to the user name 405 of FIG. 4 is displayed.

In the result display field 614, information corresponding to the execution result 406 of FIG. 4 is displayed. The record display information displayed in the job history list 610 of FIG. 6 is only an example. The contents of the list may be sorted in accordance with a reception time or a user name for display. Further, only a record in which a name of a user who performs a display operation on the job history screen 600, and a user name 405 in the job history record match with each other, may be displayed.

The display field 615 for comparing the execution times by print speed models is a field for displaying an execution result and an estimation result of each print speed model managed by the print speed model management unit 5. The document name "Bill XXX" in the job history list 610 indicates that the job is executed in "50 PPM model". This is an example in which information (in FIG. 6, "- - -") obtained by forming the print speed model 409 acquired from the job history management unit 4 by the job control unit 10 are displayed. The execution time (in FIG. 6, "190 seconds") is information corresponding to the execution time 408 acquired from the job history management unit 4.

Further, execution times and results of print speed models (in FIG. 6, "80 PPM model" and "65 PPM model") other than "50 PPM model" which are not managed as the record of the job history indicate information estimated by the job control unit 10 employing the above-described estimating method. For example, the execution time of "80 PPM model" is estimated to be "123 seconds", and the effect is estimated to be "+60%". Further, the execution time of "65 PPM model") is estimated to be "149 seconds", and the effect is estimated to be "+30%".

In the display field 615 for comparing execution times by print speed models, the actual execution time is compared with an execution time when the job is assumed to be executed in another print speed model. However, an actual execution speed may be compared with an assumed execution speed when the job is executed in another print speed model. That is, information about the actual execution speed may be compared with information about the assumed print speed. Thus, the print apparatus 300 can create a report based on the history information of the print job at least by using the information about the print speed setting included in the history information. This report includes information about comparison between the information about the actual execution speed and the information about the assumed print speed.

The detailed information button 620 is used to display detailed information about each record displayed on the job history list 610. When the detailed information button 620 is pressed down with a record selected from the job history list 610, the job control unit 10 acquires contents of the selected recorded from the job history management unit 4, and forms and displays the contents.

The list print button 630 is used to instruct printing of the job history managed by the job history management unit 4. When the list print button 630 is pressed down, the job control unit 10 acquires all the records of the job histories from the job history management unit 4 and forms the records to make prints. The OK button 640 is used by a user to close the job history screen 600.

The user checks a use state of the print apparatus 300 through the information indicated in the job history list 610, and thus can check an effect of the set print speed model. FIG. 6 reveals that, as to the jobs of document names "bill XXX" and "bill YYY", it can be seen that the productivity of the print apparatus is increased when a model is changed to a higher-print speed model. On the contrary, FIG. 6 reveals that, in a job with a document name "written approval KKK", the productivity does not greatly increase even if the print speed model is changed. In this case, the user selects the job and presses down the detailed information button 620 to check more detailed information about the job history to analyze a reason why the productivity does not increase.

For example, the user can conduct an analysis to know whether a kind of paper that causes a decrease in the productivity is used or whether post-processing that requires a long time is set, based on the information about the print settings 414. Further, in a job input long after a previous job has ended, a PPM value measured by the job control unit 10 includes a time until first print paper is conveyed to the conveyance path 214 or a sheet re-feeding conveyance path 219 after the printing operation relating to the job starts. For this reason, in this case, the PPM measured value becomes smaller than a case where the similar job is continuously executed. That is, the analysis reveals that the productivity does not increase when a job is input long after a previous job has ended. This tendency is remarkable in a job in which a number of all output pages is small.

Figure 7A:
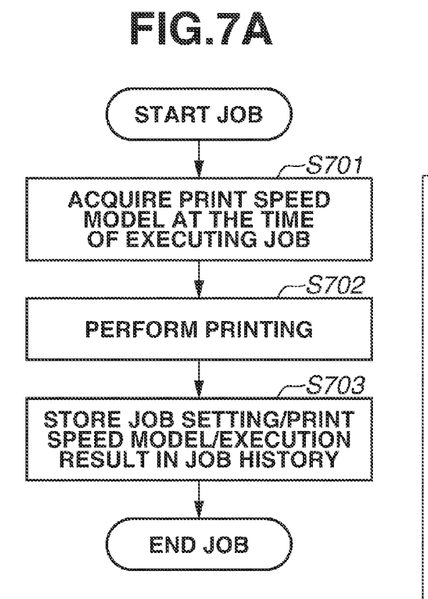
FIGS. 7A and 7B are flowcharts illustrating processing to be executed by the print apparatus according to one or more aspects of the present disclosure.
Figure 7B:
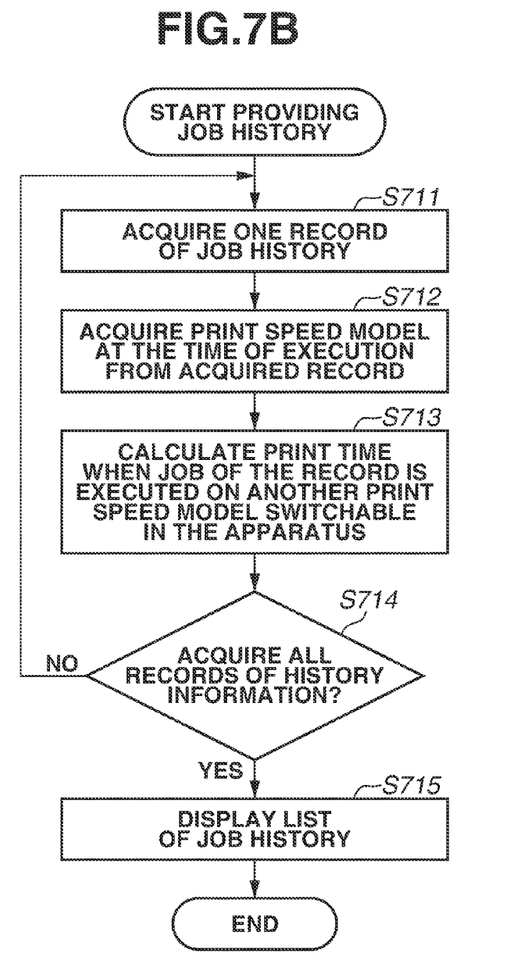

FIGS. 7A and 7B are flowcharts illustrating the processing in the print apparatus 300. The processing in the flowcharts of FIG. 7A and FIG. 7B is executed by the job control unit 10. In other words, the processing in the flowcharts is realized by CPU 11 loading and executing a program stored in the ROM 12.

FIG. 7A is the flowchart illustrating job history storage processing when a job is executed.

When a job is received, in step S701 the job control unit 10 acquires a print speed model used at the time of executing the job, from the print speed model management unit 5. At this time, the print speed model management unit 5 determines a print speed model based on attributes of the job executed by the job control unit 10 (document name, user name, reception time, etc.). Namely, the print speed model management unit 5 sets one of a plurality of print speeds as a set print speed for the received job. The job control unit 10 acquires this result.

In step S702, the job control unit 10 causes the printer control unit 2 to execute the printing job in the print speed model acquired in step S701. At this time, the printer control unit 2 performs the printing at a conveyance speed of the print paper corresponding to the PPM of the print speed model or at conveyance intervals of the print paper. At the same time, the job control unit 10 acquires a conveyance result of the print paper from the printer control unit 2, and obtains a PPM measured value in accordance with the above-described method.

When the printing job controlled by the job control unit 10 ends, in step S703, the job control unit 10 causes the job history management unit 4 to store a job history. At this time, the job control unit 10 notifies the job history management unit 4 of the attributes of the executed job, the print speed model acquired in step S701, and the job execution result (for example, the information shown in FIG. 4) including the PPM measured value obtained in step S702. The job history management unit 4 stores and manages the information as the job history. Thus, the job history management unit 4 stores, for one or more executed jobs, job histories including the speed models of the print apparatus 300 at the time of executing the jobs, for example, as illustrated in FIG. 4. The stored job histories are used in the processing described with reference to FIG. 7B.

FIG. 7B is the flowchart illustrating processing for presenting a job history managed by the job history management unit 4. According to this flowchart, the job control unit 10 creates job history information (reports) to be presented to the user, based on job histories of executed one or more jobs stored in the job history management unit. The job control unit 10 uses at least the information about the speed models of the print apparatus at the time of executing the jobs to create the reports.

When a display operation of the job history screen 600 is received via the operation interpretation unit 8, the job control unit 10 acquires, in step S711, one record of the job histories from the job history management unit 4 (for example, one record illustrated in FIG. 4).

In step S712, the job control unit 10 acquires the print speed model 409 (FIG. 4) used at the time of executing the job represented by the record acquired in step S711.

In step S713, the job control unit 10 acquires a list of the print speed models changeable in the apparatus from the job history management unit 4, and compares the acquired list with the print speed model 409 used at the time executing the job represented by the record. The job control unit 10, then, determines a print speed model used other than at the time of executing the job. Further, with the above-described estimating method, the job control unit 10 calculates a print time and an effect at the time of executing the job of the record in the print speed model other than the time of executing the job. Here, the job control unit 10 serves as a estimation unit for estimating an execution speed of the job on the assumption that the print speed model for the job was set to other print speed modes.

In step S714, the job control unit 10 controls the processing so that steps S711 to S713 are repeated for all the records of the job histories managed by the job history management unit 4. More specifically, when the job control unit 10 determines that the processing for all the records is not yet completed (No in step S714), the processing returns to step S711, and proceeds to next record. On the other hand, when the job control unit 10 determines that the processing for all the records is completed (Yes in step S714), the processing proceeds to step S715.

In step S715, the job control unit 10 forms both the information about the records of the job histories acquired in step S711 and the results calculated in step S713, and displays them as the job history screen 600 via the display control unit 7. After step S715, the job control unit 10 ends the processing in this flowchart.

The processing for presenting the job histories illustrated in FIG. 7B may be executed in a print apparatus management server (not shown) connected via a network I/F. At this time, when a job history acquisition request is received from the print apparatus management server, the job control unit 10 acquires the job history managed by the job history management unit 4, and transmits the job history to the print apparatus management server. The print apparatus management server, then, may execute the processing illustrated in FIG. 7B, and may form and present the job history information received from the print apparatus 300.

In the present exemplary embodiment, when the display operation of the job history screen 600 is received, a job history is acquired and a job history display screen is created. However, it is inefficient that the entire calculation processing in the present exemplary embodiment is executed every time when the display operation of the job history screen is received. Therefore, a job which has been once subjected to the calculation processing may be associated with a calculation result and the associated result may be stored for reuse. When the display operation of the job history screen is received, a determination is made whether the calculated result is present for each job. The calculation processing is executed only for a job that has no calculation result, namely, a job that is first executed after the display button has been pressed down the previous time. The calculation result is used to create a history display screen in conjunction with the calculation results that have been already retained. The calculation result is associated with a new job and is stored for reuse.

According to the present exemplary embodiment, the print apparatus 300 is a printer capable of improving a PPM through purchasing of a license, and is configured to create and output (print or display) a job history report by using at least information about a maximum PPM when the job is executed. Such a configuration produces an effect that a user such as an administrator can easily know a relationship between a print speed setting and a use state such as a relationship between a maximum PPM and a number of print copies at the time of executing a print job. As a result, for example, the user can easily know later a maximum PPM set when each job was executed. Therefore, the user can easily check later an effect of a change in a maximum PPM.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2016-209491, filed Oct. 26, 2016, which is hereby incorporated by reference herein in its entirety.

What is claimed is:

1. An image forming system capable of changing a print speed, comprising:
   a processor; and
   a memory storing instructions, when executed by the processor, causing the image system to function as:
   a set unit that sets, as a set print speed, one of a plurality of print speeds;
   an execution unit that executes a print job in accordance with the set print speed;
   an output unit that displays or prints, as history information of executed print jobs, information regarding the print job including information indicating the print speed set, when the print job was executed, by the set unit;
   an estimation unit that estimates an execution time of a print job whose history information is managed by a management unit in a condition that the executed print job is executed at a print speed which is different from the print speed,
   wherein the output unit outputs information about the execution time estimated by the estimation unit in a display or printing of the history information.

2. The image forming system according to claim 1, wherein the history information to be displayed or printed includes at least a name of the print job and information representing the print speed.

3. The image forming system according to claim 1, wherein the history information to be displayed or printed includes at least a name of the print job, information representing the print speed, and a name of a user who instructs execution of the print job.

4. The image forming system according to claim 1, further comprising a management unit that manages, as history information about a plurality of print jobs executed by the execution unit, information representing print speeds set, when the respective jobs were executed, by the set unit, on an individual print job basis,
   wherein the output unit displays or prints the history information about the plurality of managed print jobs including information representing print speeds.

5. The image forming system according to claim 1, wherein the set print speed is a feasible maximum print speed in the image forming system.

6. The image forming system according to claim 1, further comprising an estimation unit that estimates an execution time of a print job whose history information is managed by a management unit, in a case where the print job is executed at a print speed which is different from the print speed at the time of executing the print job and is a possible speed in the image forming system,
   wherein the output unit displays or prints also information about the execution time estimated by the estimation unit in display or printing of the history information.

7. The image forming system according to claim 1, wherein the set unit sets the print speed in accordance with a license.

8. The image forming system according to claim 1, wherein the print speed is changeable by changing an interval between sheets fed from a sheet feeding unit.

9. An image forming system control method capable of changing a print speed, the method comprising:
   setting, as a set print speed, one of a plurality of print speeds;
   executing a print job in accordance with the set print speed;
   displaying or printing, as history information of executed print jobs, information regarding the print job including information indicating the print speed set, when the print job is executed, by the setting;
   estimating an execution time of a print job whose history information is managed in a condition that the executed print job is executed at a print time which is different from the print speed; and
   outputting information about the execution speed estimated in a display or printing of the history information.

10. The method according to claim 9, wherein the history information to be displayed or printed includes at least a name of the print job and information representing the print speed.

11. The method according to claim 9, wherein the history information to be displayed or printed includes at least a name of the print job, information representing the print speed, and a name of a user who instructs execution of the print job.

12. The method according to claim 9, further comprising, managing as history information about a plurality of executed print jobs, information representing print speeds set, when the respective jobs were executed, by the setting on an individual print job basis,
   wherein the history information about the plurality of managed print jobs including information indicating respective print speeds is displayed or printed.

13. The method according to claim 9, wherein the set print speed is a feasible maximum print speed in the image forming system.

14. The method according to claim 9, wherein the print speed is changeable by changing an interval between sheets fed from a sheet feeding unit.

* * * * *